United States Patent [19]

Lee et al.

[11] Patent Number: 5,512,664

[45] Date of Patent: Apr. 30, 1996

[54] MONOAZO DYE FOR THERMAL TRANSFER PRINTING

[75] Inventors: Ki-taek Lee; Young-soup Son; Woo-seok Han; Soon-yeol Eom, all of Suwon, Rep. of Korea

[73] Assignee: Hansol Paper Co., Ltd., Seoul, Rep. of Korea

[21] Appl. No.: 359,579

[22] Filed: Dec. 20, 1994

[30] Foreign Application Priority Data

Dec. 30, 1993 [KR] Rep. of Korea ............... 93-31257

[51] Int. Cl.⁶ .................. C09B 29/36; C09B 29/085; B41M 5/30
[52] U.S. Cl. .................................. 534/799; 534/800
[58] Field of Search ............................. 534/799, 800

[56] References Cited

U.S. PATENT DOCUMENTS

| | | | |
|---|---|---|---|
| 3,454,550 | 7/1969 | Newland | 534/799 |
| 3,776,898 | 12/1973 | Stanley et al. | 534/799 X |
| 3,943,120 | 3/1976 | Peter et al. | 534/799 |
| 4,229,345 | 10/1980 | Lamm | 534/799 X |
| 4,701,439 | 10/1987 | Weaver et al. | 503/227 |
| 4,764,178 | 8/1988 | Gregory et al. | 8/471 |

FOREIGN PATENT DOCUMENTS

| | | | |
|---|---|---|---|
| 2613595 | 10/1976 | Germany | 534/799 |
| 59-78894 | 5/1984 | Japan. | |
| 59-227948 | 12/1984 | Japan. | |
| 61-227092 | 10/1986 | Japan. | |
| 62-99195 | 5/1987 | Japan. | |

OTHER PUBLICATIONS

Hrabak et al., *Chemical Abstracts*, 92:76981r (1980).
Hrabak et al., *Chemical Abstracts*, 94:48829v (1981).
Hrabak et al., *Chemical Abstracts*, 94:157533q (1981).
Janssens et al., Research Disclosure, Dec. 1990, 928–939.

*Primary Examiner*—Fiona T. Powers
*Attorney, Agent, or Firm*—Leydig, Voit & Mayer

[57] ABSTRACT

A new sublimable magenta monoazo dye for thermal transfer printing has a closed ring imido group in an aromatic azo compound, as the following formula:

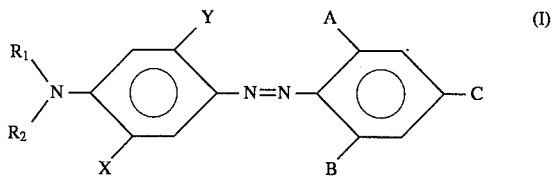

The magenta monoazo dye achieves substantial improvements in stability, hue, gray and color development.

11 Claims, No Drawings

MONOAZO DYE FOR THERMAL TRANSFER PRINTING

BACKGROUND OF THE INVENTION

1. Field of the Invention

The present invention relates to a monoazo dye for thermal transfer printing, and especially to an imido-substituted monoazo dye for a sublimable magenta dye used in thermal transfer printing, which has good hue, gray and dye stability.

2. Description of the Related Art

In recent years, thermal transfer printing systems have been widely used in facsimile and copying machines, and have been further developed such that prints can be obtained from pictures generated electronically from a color video camera or computer. As one way of obtaining such prints, a thermal transfer printing system using a sublimable dye has been developed.

According to such a thermal transfer printing system, an electronically generated picture is first subjected to color separation by color filters. The respective color-separated images are then converted into electrical signals which are operated on to produce Y (yellow), M (magenta) and C (cyan) electrical signals. These signals are then transmitted to a thermal printer. Sublimable yellow, magenta and cyan dyes which are heat-transferable, are applied to a sheet-like substrate in the form of an ink, to form a transfer sheet. This is then placed in contact with the material to be printed, that is, a receiving sheet. The two sheets are then inserted between a thermal printing head and a platen roller. The thermal printing head hammer heating elements and is heated sequentially in response to the yellow, magenta and cyan signals. The transfer sheet is selectively heated in accordance with a pattern information signal corresponding to one color, so that dye from the selectively heated regions of the transfer sheet is sublimated and transferred to the receiving sheet and thereby forms a pattern thereon, the form and density of which is in accordance with the pattern and intensity of the heat applied to the transfer sheet. The process is then repeated for the other two colors, and by combining the three colors, a full-color hard copy is obtained which corresponds to the original picture viewed on a screen.

A sublimable dye for thermal transfer printing must satisfy several conditions. That is, such a dye should exhibit: (a) sufficient mobility so as to sublime while not thermally disintegrating during thermal printing head operation; (b) a high molar absorptivity coefficient; (c) stability with respect to light, humidity, heat and various chemicals; (d) good hue and gray characteristics; and (e) facility in manufacture.

As dyes for thermal transfer printing, U.S. Pat. No. 4,698,651 discloses a magenta dye-donor element comprising a substituted 5-arylazoisothiazole, U.S. Pat. No. 4,701,439 discloses a yellow dye-donor element having a cyanovinyltetrahydro-quinoline structure, and U.S. Pat. No. 4,695,287 discloses a cyan dye-donor element comprising a 2-carbamoyl-4-[N-(p-substituted aminoaryl)imino]-1,4-naphthoquinone. Further, U.S. Pat. No. 4,764,178 discloses an azo dye having a diazotizable heteroaromatic amine and an aromatic coupling component. Also, Japanese Patent Laid-open Publication sho 59-78894 discloses a cyan dye having a naphthalene dione structure, and Japanese Patent Laid-open publication sho 59-227948 discloses a cyan dye having an anthraquinone structure. Many of these dyes, however, do not meet the requirements (a through e) for thermal transfer printing.

Furthermore, it would be desirable to improve stability with respect to light and heat as well as various color characteristics such as hue, and color development. To provide a magenta dye which has achieves such improvements, Japanese Patent Laid-open Publication sho 61-227092 discloses an azo dye having the following structure:

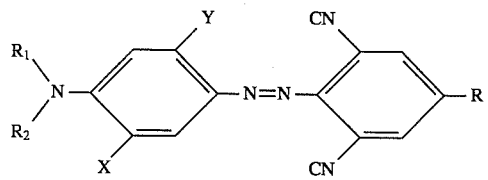

wherein Y is hydrogen, alkoxy, methyl or halogen, and X is methyl, methoxy, formylamyl, alkylcarbonylamyl, alkylsulfonylamyl or alkoxycarbonylamyl. Similarly, Japanese Patent Laid-open Publication sho 62-99195 discloses an azo dye having the following structure:

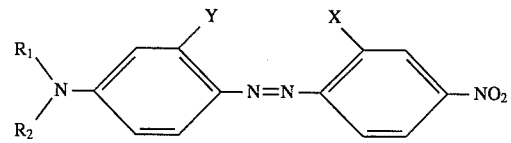

wherein Y is hydrogen, methyl or acylamyl, and X is cyano or halogen. However, neither of these azo compounds for magenta dye completely solves the above problems.

SUMMARY OF THE INVENTION

The object of the present invention is, therefore, to provide a new sublimable magenta monoazo dye for a thermal transfer printing, which exhibits substantial improvement in terms of stability, hue, gray and color development.

According to the present invention, there is provided a magenta monoazo dye for thermal transfer printing having the following Formula (I)

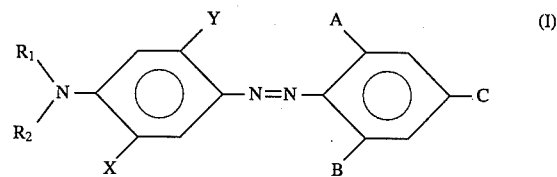

wherein:

$R_1$ and $R_2$ are each independently selected from the group consisting of hydrogen, substituted or unsubstituted $C_{1-8}$-alkyl, cycloalkyl, aryl, 2-cyanoalkyl, 2-hydroxyalkyl, 2-alkoxyalkyl and 2-acetoxyalkyl;

A, B and C are each independently selected from the group consisting of hydrogen, halogen, cyano, nitro, carboxyamino, trifluoromethyl, acetoxy, benzoxy, $C_{1-4}$-alkoxy, $C_{1-6}$-alkyl, alkyl- or aryl-sulfonamino, alkyl- or aryl-sulfonyl, alkyl- or aryl-carbonyl, $C_{1-6}$-hydroxyalkyl and $C_{1-6}$-alkoxyalkyl;

X is hydrogen, $C_{1-4}$-alkyl, $C_{1-4}$-alkoxy or halogen; and

Y is selected from the following substituents,

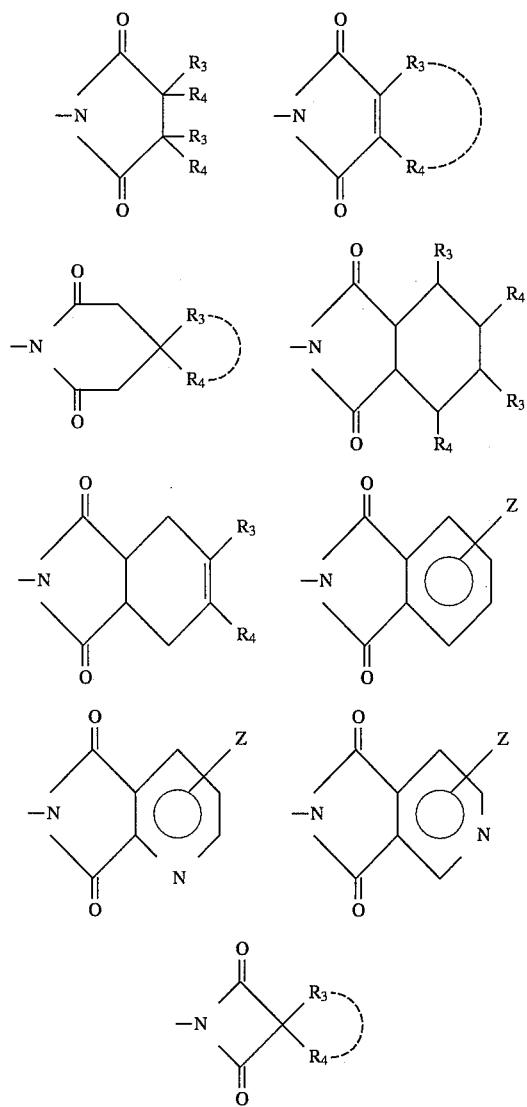

wherein $R_3$ and $R_4$ are each independently selected from the group consisting of hydrogen substituted or unsubstituted $C_{1-4}$-alkyl halogen, alkylcarboxylate, and carbonyl

represents a cyclized structure where $R_3$ and $R_4$ are combined to form saturated or unsaturated cycloalkyl of $C_{3-6}$, or represents a non-cyclized structure where $R_3$ and $R_4$ are each independently selected from the group consisting of hydrogen, substituted or unsubstituted $C_{1-4}$-alkyl, halogen, alkylcarboxylate, and carbonyl; and Z is nitro, halogen, $C_{1-4}$-alkyl, $C_{1-4}$-alkoxy, sulfonyl, carbonyl, carboxyamide, sulfonamino, cyano, hydroxy or hydrogen.

DETAILED DESCRIPTION OF THE INVENTION

In the present invention, by introducing a closed ring imido group into an aromatic azo compound, a substantial improvement is achieved in dye stability, hue, gray and color development.

The compounds used in the present invention may be prepared by an established synthetic procedure such as that described in Example 1 below.

In a preferred embodiment of the present invention, $R_1$ and $R_2$ in the structural Formula (I) are each independently selected from the group consisting of substituted or unsubstituted $C_{2-3}$-alkyl, 2-cyanoethyl and 2-ethoxyethyl.

In another preferred embodiment of the present invention, X is hydrogen, methoxy or methyl group.

In still another preferred embodiment of the present invention, A and B are each independently selected from the group consisting of cyano, bromo, chloro and nitro, and C is chloro, cyano, nitro, fluoro, trifluoromethyl, $C_{1-2}$-alkoxy or bromo.

In yet another preferred embodiment of the present invention, Y is a substituted or unsubstituted succinimide, maleimide, or phthalimide.

In yet another preferred embodiment of the present invention, $R_3$ and $R_4$ are each independently $C_{1-2}$-alkyl group, or are combined together to form $C_{4-5}$-saturated or unsaturated cycloalkyl.

In yet another preferred embodiment of the present invention, B is hydrogen or cyano, and A and C are each independently selected from the group consisting of cyano, nitro, chloro and fluoro.

In yet another preferred embodiment of the present invention, Z is acetamido, nitro, halogen or hydrogen.

The compounds of Formula (I) wherein $R_1$ and $R_2$ are each independently $C_{2-4}$-alkyl, X is a hydrogen, Y is succinimide, and A and B are cyano, or C is nitro, preferably show good color development.

Compounds included within the scope of the present invention comprises the following:

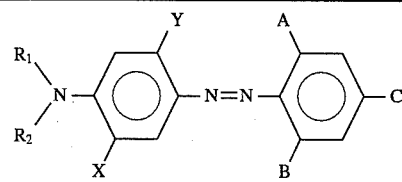
| COMPOUND NO. | $R_1$ | $R_2$ | X | Y | A | B | C |
|---|---|---|---|---|---|---|---|
| 1 | $C_2H_5$ | $C_2H_5$ | H | succinimido | CN | H | $NO_2$ |
| 2 | $C_2H_5$ | $C_2H_5$ | H | maleimido | CN | H | $NO_2$ |
| 3 | $C_2H_5$ | $C_2H_5$ | H | phthalimido | CN | H | $NO_2$ |
| 4 | $C_2H_5$ | $C_2H_5$ | H | succinimido | CN | CN | CN |
| 5 | $C_2H_5$ | $C_2H_5$ | H | maleimido | CN | CN | CN |
| 6 | $C_2H_5$ | $C_2H_5$ | H | phthalimido | Br | CN | CN |
| 7 | $C_2H_5$ | $C_2H_5$ | H | succinimido | Br | CN | CN |
| 8 | $C_2H_5$ | $C_2H_5$ | $OCH_3$ | succinimido | CN | CN | $CH_3$ |

-continued
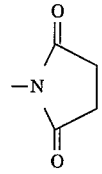
| COMPOUND NO. | R₁ | R₂ | X | Y | A | B | C |
|---|---|---|---|---|---|---|---|
| 9 | $C_2H_5$ | $C_2H_5$ | $CH_3$ | succinimido | CN | CN | Cl |
| 10 | $C_2H_5$ | $C_2H_5$ | $OCH_3$ | succinimido | CN | CN | F |
| 11 | $C_2H_5$ | $C_2H_5$ | H | succinimido | CN | CN | Cl |
| 12 | $C_2H_5$ | $C_2H_5$ | $OCH_3$ | maleimido | CN | CN | F |
| 13 | $C_2H_5$ | $C_2H_5$ | H | phthalimido | CN | CN | F |
| 14 | $C_2H_5$ | $C_2H_5$ | $CH_3$ | succinimido | CN | CN | CN |
| 15 | $C_2H_5$ | $C_2H_5$ | $OCH_3$ | 3,3-dimethylsuccinimido | CN | CN | $NO_2$ |

-continued

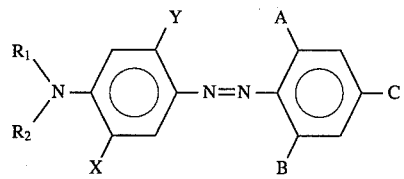

| COMPOUND NO. | R₁ | R₂ | X | Y | A | B | C |
|---|---|---|---|---|---|---|---|
| 16 | $C_2H_5$ | $C_2H_5$ | H | pyridine-fused maleimide (−N) | CN | CN | −NHCOCH₃ |
| 17 | $C_2H_5$ | $C_2H_5$ | $OCH_3$ | succinimido (−N) | $NO_2$ | $NO_2$ | CN |
| 18 | $NCCH_2CH_2$ | $C_2H_5$ | $OCH_3$ | succinimido (−N) | CN | CN | Cl |
| 19 | $HOCH_2CH_2$ | $C_2H_5$ | H | 3,4-dimethylsuccinimido (−N) | $NO_2$ | Cl | $NO_2$ |
| 20 | $CH_3COCH_2CH_2$ | $C_3H_7$ | H | succinimido (−N) | $NO_2$ | H | CN |
| 21 | $NCCH_2CH_2$ | $NCCH_2CH_2$ | H | succinimido (−N) | CN | CN | −COCH₃ |
| 22 | $CH_3COCH_2CH_2$ | $C_2H_5$ | $OCH_3$ | succinimido (−N) | CN | CN | $CF_3$ |
| 23 | $C_2H_5$ | $C_2H_5$ | H | succinimido (−N) | CN | CN | −OCOCH₃ |

-continued

| COMPOUND NO. | R₁ | R₂ | X | Y | A | B | C |
|---|---|---|---|---|---|---|---|
| 24 | $C_2H_5$ | $C_2H_5$ | $CH_3$ | succinimido | Br | CN | CN |
| 25 | $C_2H_5$ | $C_2H_5$ | $CH_3$ | succinimido | CN | CN | $NO_2$ |
| 26 | $C_2H_5$ | $C_2H_5$ | H | phthalimido | CN | CN | $OCH_3$ |
| 27 | $C_2H_5$ | $C_2H_5$ | H | phthalimido | CN | CN | Cl |
| 28 | $C_2H_5$ | $C_2H_5$ | H | succinimido | CN | CN | F |
| 29 | $C_2H_5$ | $C_2H_5$ | $CH_3$ | succinimido | CN | CN | F |
| 30 | $C_2H_5$ | $NCCH_2CH_2$ | H | succinimido | CN | CN | CN |

-continued
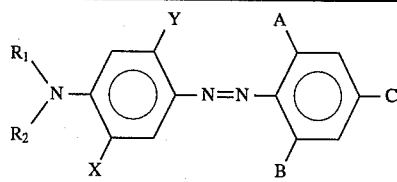
| COMPOUND NO. | $R_1$ | $R_2$ | X | Y | A | B | C |
|---|---|---|---|---|---|---|---|
| 31 | $C_2H_5$ | $C_2H_5$ | H | maleimide | CN | CN | $NO_2$ |
| 32 | $C_2H_5$ | $C_2H_5$ | $OCH_3$ | maleimide | CN | CN | $CH_3$ |
| 33 | $CH_3COCH_2CH_2$ | $C_2H_5$ | H | succinimide | CN | CN | Br |
Preferably, the compound of the Formula (I) is selected from following compounds:
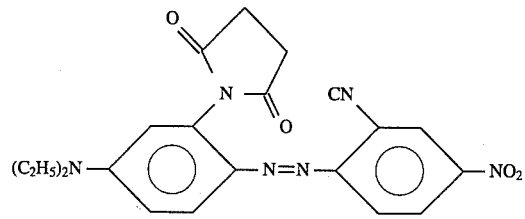
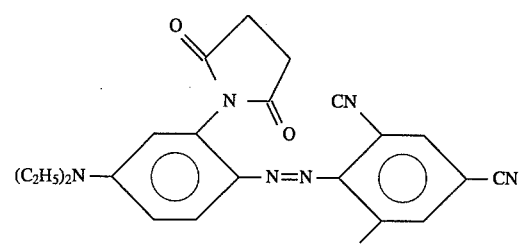
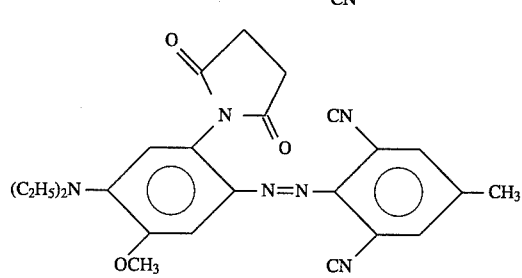
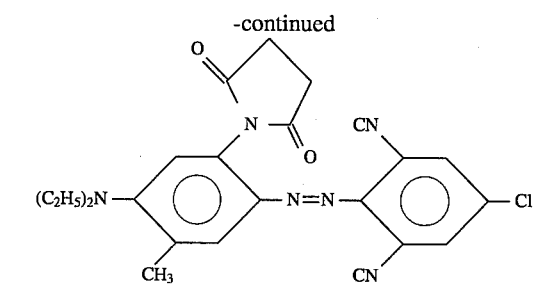
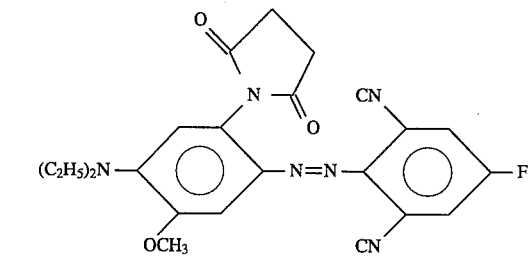
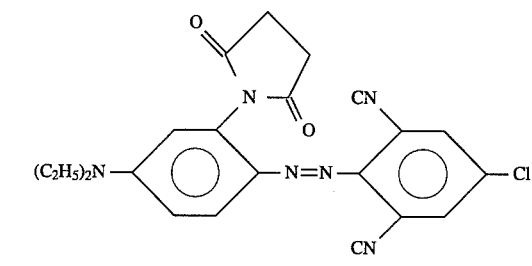

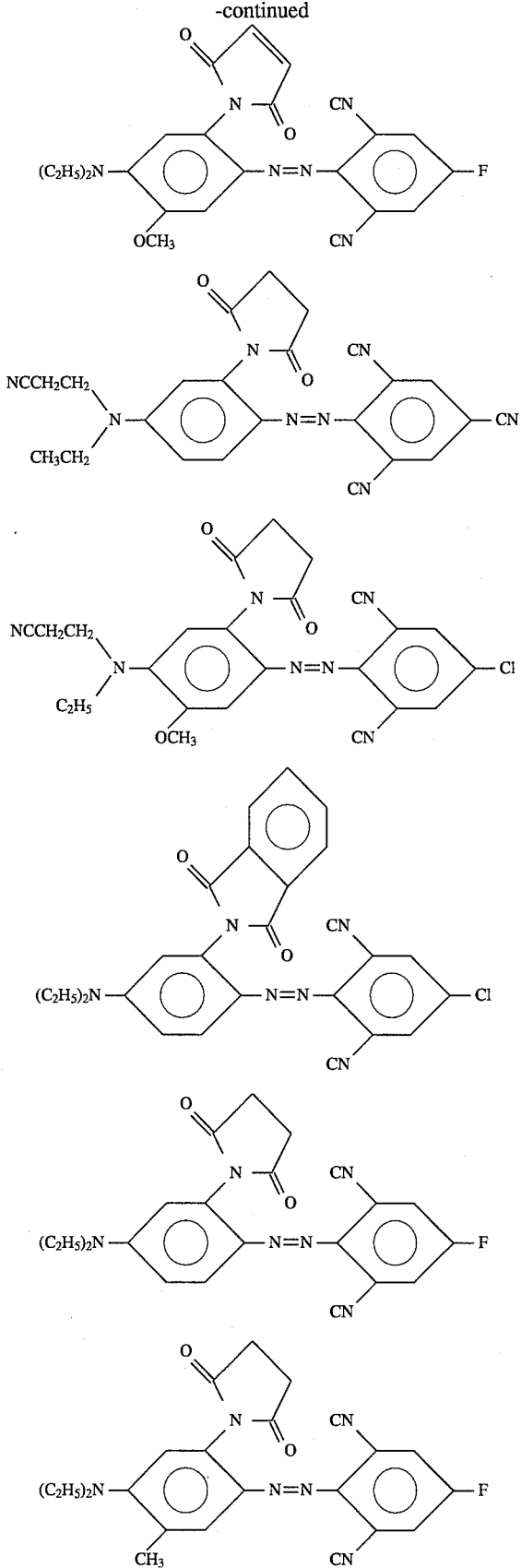

The dye of the present invention may be dispersed and dissolved in an organic solvent with a binder to make an ink composition for thermal transfer. The ink composition may be coated on a substrate to make a transfer sheet. The transfer sheet coated with a dye may be in contact with a receiving sheet, so that the dye is adjacent to the receiving sheet. Then, selective heating and pressing of the back side of the transfer sheet with a thermal printing head results in a selective transferring of the dye to print a desired picture on the receiving sheet.

The ink composition containing a dye compound of the present invention preferably comprises: 2–8% by weight of a dye of Formula (I); 2–8% by weight of a binder; and 84–96% by weight of an organic solvent.

In the ink composition, the amount of the dye is preferably in the range of 2% to 8% by weight. If the amount of the dye is less than 2% by weight, the concentration of the dye transferred is low and the sensitivity of the color development decreases, while an amount of more than 8% by weight leads to problems of solubility and waste. The amount of the binder is preferably in the range of 2–8% by weight of the ink composition. If the amount of the binder is less than 2% by weight, the viscosity of the composition is low and the adhesiveness decreases, so that the dye may easily come off upon coating or after coating. On the other hand, for amounts of binder more than 8% by weight, the viscosity of the composition is so high that the coating process is difficult, the coating layer is uneven, and it is difficult to transfer the dye.

The binder may be any resinous or polymeric material suitable for binding the dye to the substrate. Examples of suitable binders are cellulose derivatives such as ethylcellulose, hydroxyethylcellulose, methylcellulose, cellulose acetate butyrate; vinyl resins and derivatives thereof such as polyvinyl alcohol, polyvinyl acetate, polyvinyl butyrate, polyacrylamide; polyacrylic acid, polymethylmethacrylate, polycarbonate, polysulfone and polyphenylene oxide.

The organic solvent used in the ink composition may be methanol, ethanol, toluene, methylethylketone, cyclohexanone, or N,N-dimethylformamide.

The ink composition may also contain other additives, such as curing agents or preservatives.

The ink composition may be coated on the substrate to form a dye layer with a preferred thickness of 0.4–2.0 μm.

The substrate for the transfer sheet may be any convenient sheet material capable of withstanding temperature of about 400° C. for periods of approximately 20 milliseconds, yet thin enough to transmit heat applied on one side through to the dye on the other side, to effect transfer to a receiving sheet within 10 milliseconds. Examples of suitable materials are polyester such as polyethylene terephthalate, polyamide, polyacrylate, polycarbonate, cellulose ester, fluorine polymer, polyacetal and polyamide. The thickness of the substrate is preferably in the range of 2–15 μm. If the thickness is less than 2 μm, the substrate film may be distorted upon contact with a thermal printing head of a high temperature, while thicknesses of more than 15 μm result in poor heat transfer and decreased thermal transfer sensitivity.

The backside of the substrate for a transfer sheet may be coated with a slipping layer to prevent the substrate film from being distorted and to prevent the thermal printing head from sticking to the film. The materials for such a slipping layer may be carboxylate, sulfonate, phosphate, aliphatic amine, polyoxyethylene alkylester, polyethyleneglycol fatty acid ester, silicone oil or synthetic oils.

A dye barrier layer may be employed between a substrate film and a dye layer to prevent the dye from thermally transferring to the substrate. The materials for the dye barrier layer may be a hydrophilic polymer such as polyacrylamide, butylmethacrylate, polyvinylalcohol and polyvinylacetate.

The receiving sheet usually comprises a substrate having thereon a dye receiving layer. The substrate for the receiving sheet may be polyethylene terephthalate, polyester sulfone, polyamide, cellulose ester, polyester with a white pigment incorporated therein, or a synthetic paper.

The dye receiving layer is coated on the substrate to absorb and diffuse the transferred dye more easily. The dye receiving layer may be, for example, polycarbonate, polyurethane, polyester, polyamide, polyvinylchloride, styrene-acrylonitrile copolymer, or polycaprolactam. The dye receiving layer may contain a slipping material, such as wax or silicone oil, to facilitate the separation of the layer after dye transferring.

The present invention will be described in detail by way of the following examples which are merely representative and illustrative of the present invention and in no way are to be considered as limiting the invention to specific examples.

Example 1

Synthesis of Compound 1

N,N-diethyl-3-succinimido aniline (1 mmol) was dissolved in a mixture of 5 g of water and 0.3 g of concentrated HCl, and then the solution was cooled to 0° C. A solution of 5-anthranilonitrile (1 mmol) in a mixture of 1 ml of concentrated $H_2SO_4$ and 0.5ml of glacial acetic acid was dropped gradually in to a solution of sodium nitrite (1 mmol) in 0.5 ml of concentrated $H_2SO_4$ below 5° C. Then, the mixed solution was stirred for 30 minutes. The stirred solution was dropped into the cooled solution of N,N-diethyl-3-succinimido aniline, neutralized for two hours at room temperature, and then filtered. The solid was washed several times with water and dried in a vacuum to give purified Compound 1 (0.9 mmol, i.e., a 90% yield).

Preparation of Ink Composition

4% by weight of Compound 1 and 4% by weight of BX-5 polybutyral resin were dispersed and dissolved in 96% by weight of methylethylketone at 50° C., and then the solution was cooled to room temperature, to give the ink composition.

Preparation of Transfer Sheet

A transfer sheet was prepared by applying the ink composition to a sheet of 7 μm thick polyethylene terephthalate film using a bar coater to give 1 g/m² of dry coat, and then drying the coating.

Examples 2 to 18

Transfer sheets were prepared by the method of Example 1 using compounds as indicated in TABLE 1, in place of Compound 1.

Comparative Example 1

A transfer sheet was prepared by the method of Example 1 using Compound A having the following formula, in place of Compound 1.

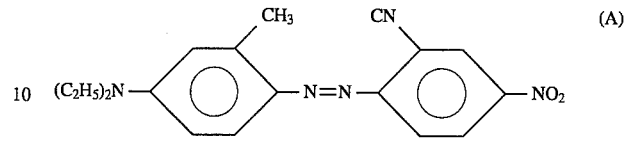

Comparative Example 2

A transfer sheet was prepared by the method of Example 1 using Compound B having the following formula, in place of Compound 1.

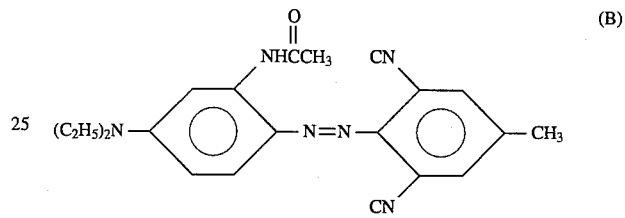

The color development and dye stability of each transfer sheets prepared in Examples 1 to 18 and Comparative Examples 1 and 2 were assessed by the following methods. The results of the assessments are set out in TABLE 1.

1) Assessment of color development

A color development was assessed using a transfer sheet prepared in each of the above examples and comparative examples and a receiving sheet (Sony, UPC 3010), at the thermal head (TH-FMR) conditions of 22 V and 1.5 W/dot. A color density was determined by densitometer (TR 1224).

2) Assessment of dye stability

A receiving sheet which has a dye transfer image formed from the transfer sheet prepared in each of the above examples and comparative Examples was placed at the condition of 35±2° C. and 60±2% RH for 48 hours using a xenon weather-o-meter (Atlas, ES-25). The density loss during the period was determined by the densitometer.

As shown in TABLE 1, when used as inks for the thermal transfer, the dyes of Formula (I) of the present invention all have good or acceptable hue and gray, and show superior dye stability compared to the control dyes of a similar structure.

TABLE I

| EXAMPLES | DYE COMPOUNDS | λmax (nm) | COLOR DENSITY | DENSITY LOSS (%) |
|---|---|---|---|---|
| EXAMPLE 1 | COMPOUND 1 | 536.0 | 2.05 | 10.0 |
| 2 | 2 | 536.9 | 1.95 | 11.0 |
| 3 | 4 | 577.8 | 2.15 | 8.0 |
| 4 | 6 | 549.3 | 1.99 | 12.3 |
| 5 | 8 | 521.8 | 1.98 | 12.0 |

TABLE I-continued

| EXAMPLES | DYE COMPOUNDS | λmax (nm) | COLOR DENSITY | DENSITY LOSS (%) |
|---|---|---|---|---|
| 6 | 9 | 539.0 | 2.05 | 10.0 |
| 7 | 10 | 527.3 | 2.04 | 9.0 |
| 8 | 11 | 537.2 | 2.11 | 8.0 |
| 9 | 12 | 527.7 | 2.02 | 10.0 |
| 10 | 14 | 579.1 | 2.11 | 9.0 |
| 11 | 18 | 535.2 | 2.13 | 7.0 |
| 12 | 25 | 591.0 | 1.98 | 8.0 |
| 13 | 27 | 527.7 | 2.03 | 10.0 |
| 14 | 28 | 525.2 | 2.09 | 9.0 |
| 15 | 29 | 527.1 | 2.13 | 9.0 |
| 16 | 31 | 585.1 | 1.98 | 13.5 |
| 17 | 32 | 545.2 | 1.92 | 11.0 |
| 18 | 33 | 531.0 | 2.05 | 8.0 |
| COMPARATIVE EXAMPLE 1 | COMPOUND A | 554.8 | 1.75 | 18.0 |
| 2 | B | 534.8 | 1.82 | 17.0 |

The invention has been described in detail with particular reference to preferred embodiments thereof, but it will be understood that variations and modifications can be effected within the spirit and scope of the invention.

What is claimed is:

1. A magenta monoazo dye having the following formula:

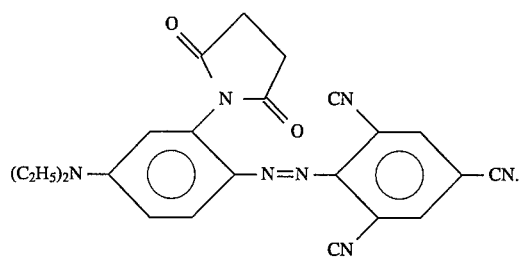

2. A magenta monoazo dye having the following formula:

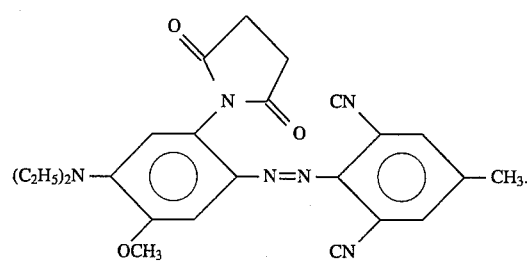

3. A magenta monoazo dye having the following formula:

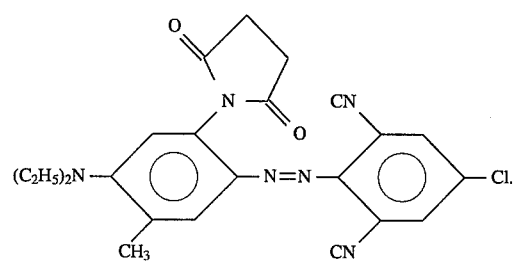

4. A magenta monoazo dye having the following formula:

5. A magenta monoazo dye having the following formula:

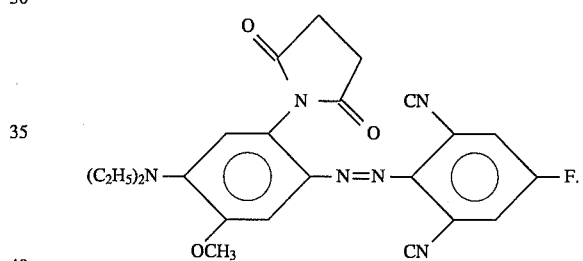

6. A magenta monoazo dye having the following formula:

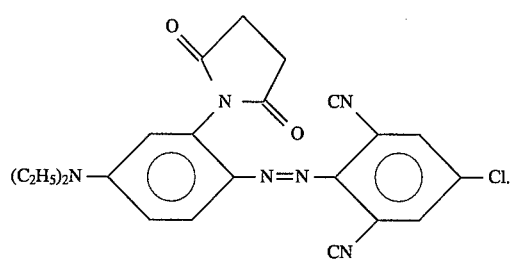

7. A magenta monoazo dye having the following formula:

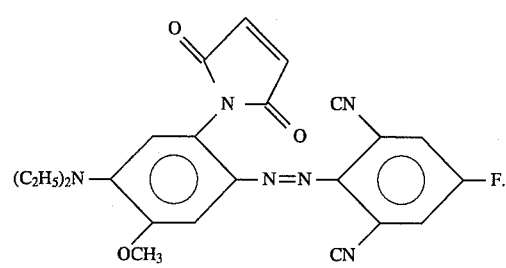

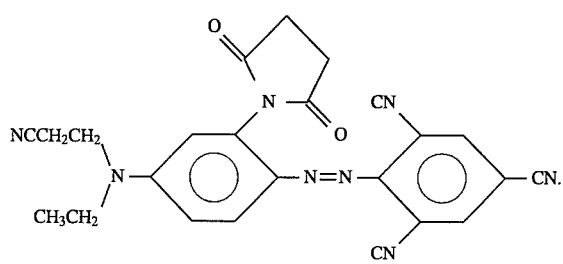
8. A magenta monoazo dye having the following formula:
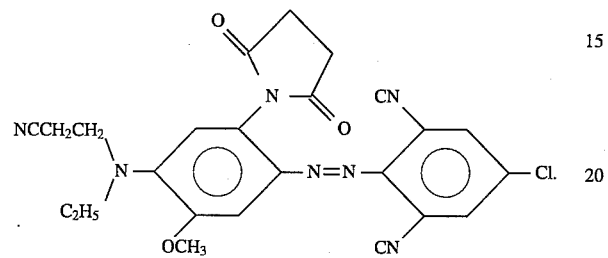
9. A magenta monoazo dye having the following formula:
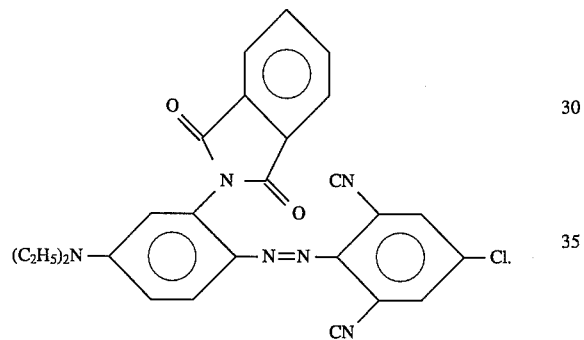
10. A magenta monoazo dye having the following formula:
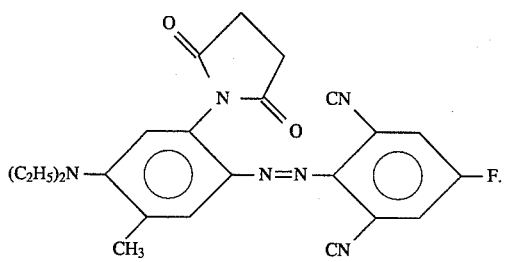
11. A magenta monoazo dye having the following formula:
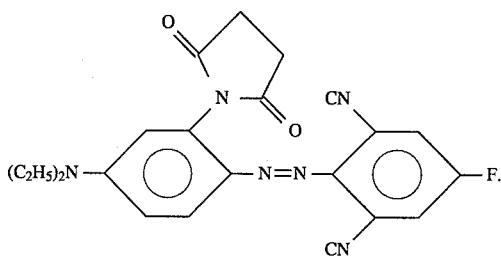
* * * * *